Patented Sept. 9, 1924.

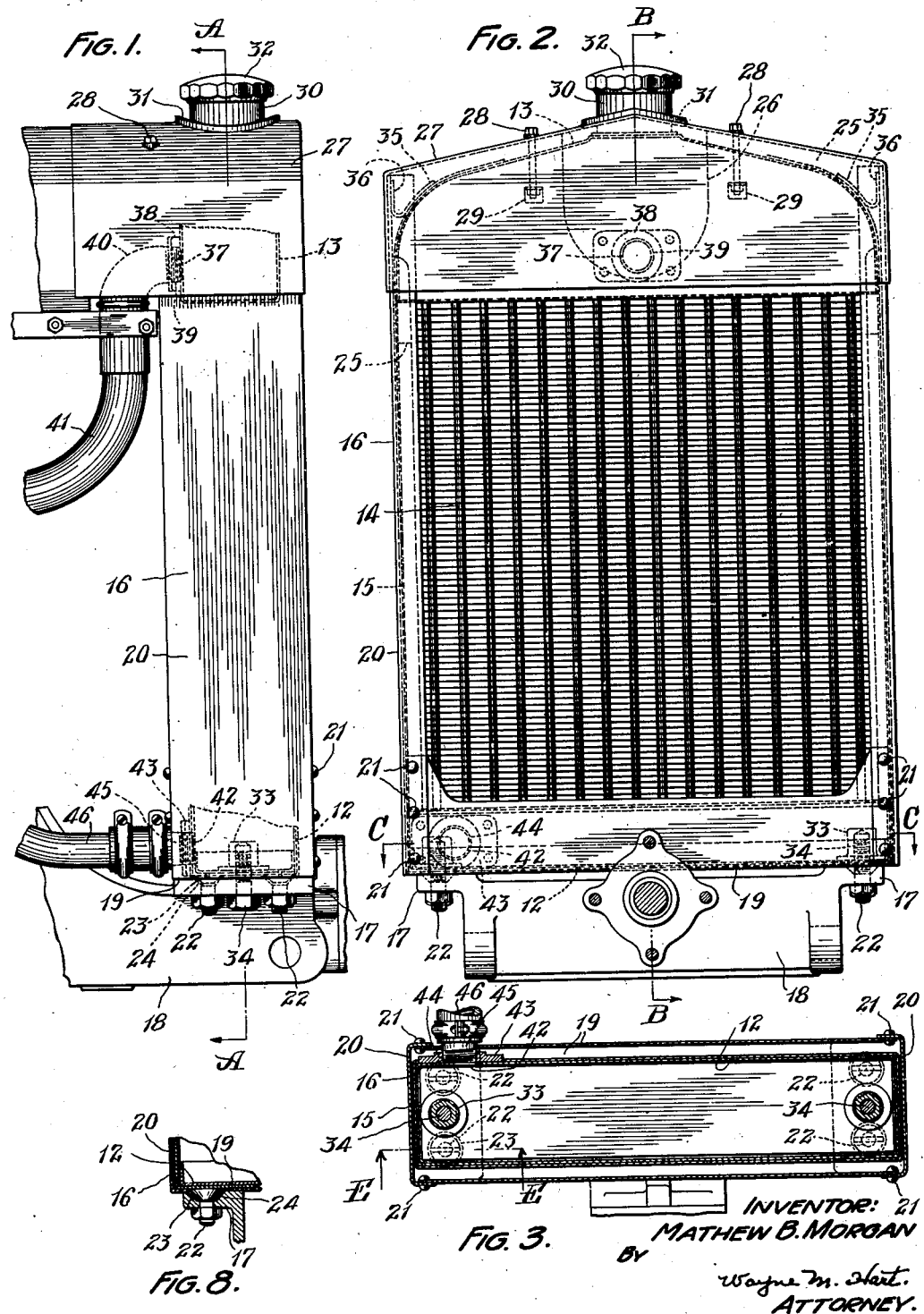

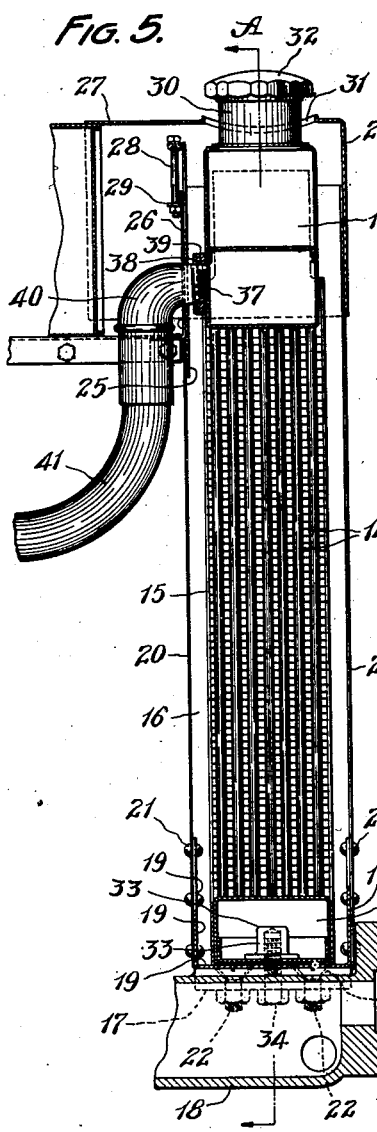

1,507,752

UNITED STATES PATENT OFFICE.

MATHEW B. MORGAN, OF CLEVELAND HEIGHTS, OHIO, ASSIGNOR TO THE CLEVELAND TRACTOR COMPANY, OF EUCLID, OHIO, A CORPORATION OF OHIO.

RADIATOR ASSEMBLY.

Application filed January 11, 1922. Serial No. 528,504.

*To all whom it may concern:*

Be it known that I, MATHEW B. MORGAN, a citizen of the United States, residing at Cleveland Heights, in the county of Cuyahoga and State of Ohio, have invented a certain new and useful Improvement in Radiator Assemblies, of which the following is a full, clear, and exact description.

This invention relates to motor vehicles and has particular reference to the means for supporting and securing the radiator upon the frame.

An object of this invention is to provide a housing, and a radiator unit which is removable from and secured within the housing, when assembled upon a vehicle frame.

Another object of this invention is to mount a radiator core within a housing and provide resilient means therein to absorb the vibrations and the strains transmitted from the vehicle frame to the radiator core.

Another object of this invention resides in providing means for mounting a radiator core and its housing upon a vehicle frame.

With these and other objects in view, the invention consists of certain novel features of construction and combination of parts as will be hereinafter set forth and pointed out in the claims.

In the accompanying drawings, Figure 1 is a side elevation showing the radiator and housing assembled upon a vehicle;

Figure 2 is a front elevation of the same;

Figure 3 is a sectional view taken on lines C—C of Fig. 2;

Figure 4 is a sectional view taken on lines A—A of Fig. 1;

Figure 5 is a vertical sectional view taken on lines B—B of Fig. 2;

Figure 6 is a sectional view taken on lines D—D of Fig. 4;

Figure 7 is a fragmentary section showing the resilient means, upon the radiator when removed from the housing; and Fig. 8 is a detail of the securing means.

Referring to the drawings by characters of reference, the radiator core comprises a bottom tank 12, a top tank 13, and a plurality of vertical tubes 14 which extend between and are connected with the two tanks so as to produce a unit structure wherein the two tanks are in free communication through said tubes. Metal plates 15 extend between and are secured to the top and bottom tank at each end thereof and serve to reinforce the radiator unit.

A radiator housing 16 is detachably fixed in an upright position upon a forwardly projecting shelf 17, of a front gear cover casting 18 which is secured to the engine casting (not shown) and forms a portion of the frame of a tractor or vehicle. The housing is built up of thin flanged metal members and consists of a bottom member 19 and upstanding members 20 which are positioned over the ends of the bottom member, the overlapping flanges of which are secured together by rivets 21. Bolts 22, the heads of which lie within depressed portions 23 of the bottom member, extend through the gear cover casting or frame. Suitable means are provided from without the cover casting to secure the bolts in position. Recesses 24 are provided in the casting to receive the depressed portion of the bottom member which assists in positioning the housing upon the radiator. A sheet metal plate 25 is secured across and projects above the top of the rear wall of the side members, which with the side members and bottom member complete a rigid housing. The plate is provided with a cut out portion 26 for reasons hereinafter described.

The radiator is inserted through the open top of the housing as a unit and rests upon the bottom member thereof. The top of the housing is closed by a removable cover or hood 27, which extends rearwardly as shown and is secured to the housing by bolts 28 which extend through metal clips 29 secured to and extending from the plate 25 at a point above the side members of the housing. A water intake 30 for the radiator extends through an opening 31 and is closed by screw cap 32. The radiator unit is detachably secured within the housing by internally threaded caps 33 which are secured on the inside of the bottom wall of the lower tank and receive bolts 34, which pass through openings in the gear cover casting, the bottom member of the housing and the tank.

A metal clip 35 is fastened to each side of the top tank and terminates in a free resilient end 36 which extends outwardly sufficiently to bear against the sides of the housing when the radiator is inserted therein. The radiator is secured at its base as described and the only other point of contact with the housing or hood is the resilient clips.

The upper tank is provided with an opening 37 in its rear side and over this opening is secured a casting 38, which is provided with an opening 39 which registers with the opening 37 in the rear face of the tank. A threaded elbow 40 is screwed into opening 37 and a hose 41 is secured to the elbow and leads to the engine cooling system (not shown). The elbow when secured to the radiator can be inserted or removed with the radiator from the housing and the cut out portion 26, previously described, allows the same to be done.

The lower tank is provided with an opening 42 in its rear side and over this opening a casting 43 having an opening 44 is secured to the outside wall of the tank. A threaded nipple 45 is screwed into the opening just described and a hose 46 is clamped over the nipple and leads to the water chambers of the engine (not shown).

From the foregoing it will be seen that the radiator has a limited amount of flexibility within the housing as it is secured at the bottom, is of a smaller size than the housing and is resiliently spaced from the cage by metal clips. The vibrations which occur will be partially taken up by this resilient mounting. The radiator can be readily assembled as a unit with the frame and is also removable as such, therefrom.

I claim—

1. In a device of the character described, the combination with a frame, of a radiator assembly comprising a housing having an open top, a radiator unit within said housing and removable therefrom through the open top, a cap removably secured over the top of said housing and vertically removable therefrom, and means detachably securing said assembly upon said frame.

2. In a device of the character described, the combination of a frame, a built up housing secured upon said frame comprising a bottom, two side members and a reinforcing member secured across the rear of the two side members of said housing, and a radiator unit secured within said housing.

3. In a device of the character described, the combination of a frame, a built up housing secured upon said frame comprising a bottom member, side members, and a reinforcing member secured across the side members, a radiator unit secured within said housing to said frame, a hood fitting over said housing, and means securing said hood to said housing.

4. In a device of the character described, the combination of a frame, an open built up housing comprising a bottom member, side members, and a reinforcing member secured across the side members, a radiator unit secured within said housing, a hood enclosing said open housing, and means for detachably securing said hood to said housing.

5. In a device of the character described, the combination of a frame, and a radiator assembly secured thereto, comprising an open housing having a bottom, side members and a reinforcing member secured across the side members, a radiator unit within said housing, a detachable hood for said housing, clips secured to the reinforcing member of said housing, and bolts securing said hood with said clips.

6. In a device of the character described, a frame, a housing secured upon said frame, a radiator unit secured at its base within said housing, and a resilient metal clip secured at one end to said unit and having its free end bearing against the inner vertical wall of said housing.

7. In a device of the character described, a frame, a housing secured to said frame, a radiator unit comprising an upper and lower water tank having hollow tubes therebetween, said unit being secured within said housing, and a resilient member secured to the upper tank of said unit and engaging the inner vertical wall of said housing.

8. In a device of the character described, the combination with a frame, of an open housing secured to said frame, a radiator unit detachably secured within said housing, said unit being vertically removable from said housing, and a cap for closing the open housing.

9. In a device of the character described, a frame, a housing secured to said frame, said housing having an open top; a radiator unit detachably secured within said housing and removable through the open top thereof, and a resilient member carried by said unit adapted to bear against the adjacent vertical wall of said housing when positioned therein.

10. In a device of the character described, a vehicle frame, a housing secured upon said frame, a radiator unit within said housing, said unit being detachably secured at its base to said frame and being otherwise free to slide vertically therein, and means between said housing and the sides of said unit for spacing said unit from the side walls of the said housing.

11. In a device of the character described, a vehicle frame, a housing secured upon said frame, a radiator unit within said housing, said unit being detachably secured at its base to said frame and being otherwise free to slide vertically therein, and flexible means between said housing and the sides of said unit for spacing said unit from the side walls of the said housing.

In testimony whereof, I hereunto affix my signature.

MATHEW B. MORGAN.